Jan. 12, 1960    W. RUEGGEBERG    2,921,197
HIGH ENERGY INDUCTOR AND TANK CIRCUIT
Filed July 25, 1957    2 Sheets-Sheet 1

INVENTOR

Werner Rueggeberg

ATTORNEY

Jan. 12, 1960 W. RUEGGEBERG 2,921,197
HIGH ENERGY INDUCTOR AND TANK CIRCUIT
Filed July 25, 1957 2 Sheets-Sheet 2
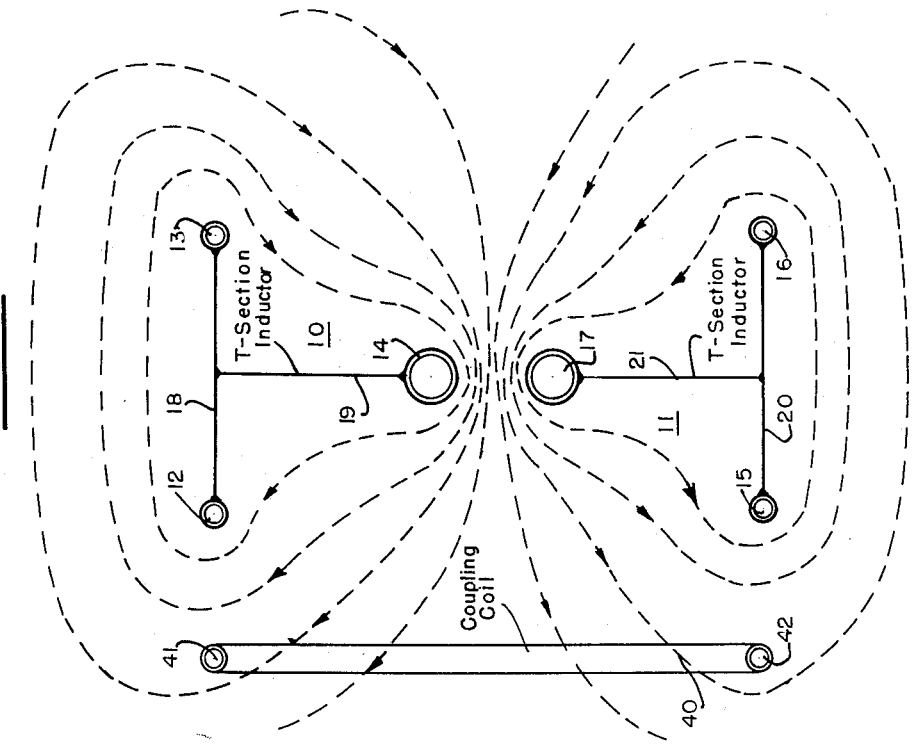
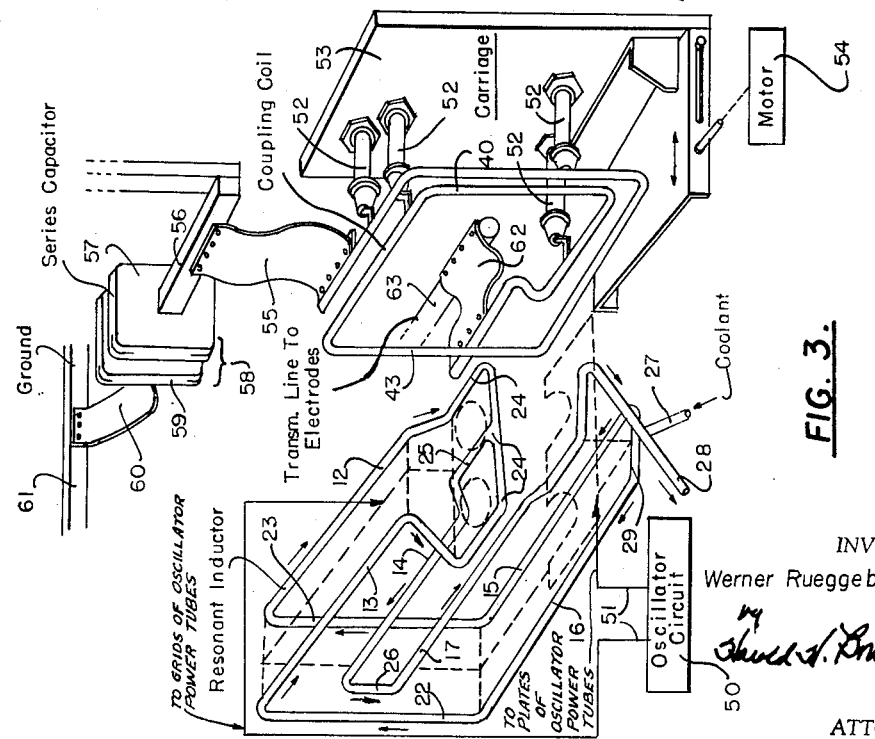
INVENTOR
Werner Rueggeberg
ATTORNEY

United States Patent Office 2,921,197
Patented Jan. 12, 1960

2,921,197

HIGH ENERGY INDUCTOR AND TANK CIRCUIT

Werner Rueggeberg, Lancaster, Pa., assignor to Armstrong Cork Company, Lancaster, Pa., a corporation of Pennsylvania Application July 25, 1957, Serial No. 674,080

20 Claims. (Cl. 250—40)

The present invention relates to electrical components for use in high-frequency high-energy level applications, and is more particularly concerned with a novel inductor and resonant tank circuit having better electrical and mechanical characteristics under the aforementioned frequency and energy conditions than other such structures suggested heretofore. In this respect, the structure of the present invention includes an improved composite or integrated tank circuit comprising a unitary inductor and capacitor mounting rack so associated with a coupling coil that the overall structure exhibits improved operation in various high-frequency high-energy level applications, such as those comprising dielectric heaters.

Many high-frequency high-energy storage electrical circuits are known at the present time, one typical such circuit comprising for instance a dielectric heater wherein high frequency energy, generated by an appropriate oscillator circuit, is ultimately impressed upon a dielectric load through the agency of electrodes or applicators disposed adjacent said load. Oscillators employed in such applications may assume various circuit configurations, but in general such oscillators include an output tank circuit, which comprises an interconnected inductor and capacitor, resonant at some preselected frequency. In the case of a typical dielectric heater application, the aforementioned tank circuit may in fact be resonant at 16.4 megacycles, and may be required to operate at an extremely high stored energy level, e.g. in excess of 4,000 kva.

Under such high-frequency high-energy level conditions, a number of significant problems are encountered. For one, the extremely high energy and large circulating currents present in the tank circuit requires that the inductor be cooled somehow, and various arrangements for circulating coolant through an inductor have in fact been suggested heretofore. In addition, the high frequencies of operation cause the inductor current to be confined for the most part to the skin of its contour; and accordingly, it is extremely desirable to so construct the inductor that a fairly large skin surface is available for current flow. Still another problem which is encountered relates to the coupling of energy out of the tank to a utilization circuit such as the aforementioned heating applicators; and this latter problem has been characterized by fairly complicated problems of flux linkage, proper coil size, and proper coil disposition relative to the inductor in the tank circuit.

Moreover, it has been found that the capacitors, e.g. vacuum capacitors, normally present in the tank circuits of high-frequency high-energy level oscillators, should somehow be cooled to assure continued proper operation of such capacitors. Problems have also been encountered in providing electrical connections between the tank capacitor and inductor, and such connections have, in the past, often included bolted friction joints which also had to be cooled to prevent a "burning up" of the joint due to excessive heat dissipation at said joint. When all of these individual inductor, capacitor, and coupling problems are combined with further general tank problems, of possible corona and arcing, stray inductance, component disposition and interconnection, compactness of assembly, and the like, the overall problem encountered in providing an efficiently operative resonant tank circuit for use in high-power high-frequency applications has been of appreciable magnitude.

By way of example, and in order to visualize quantitatively just one particular aspect of the depth of problems presented above, one need merely consider the energy storage requirements, for example, of an oscillator which is to deliver 100 kw. useful output at an effective tank circuit Q of 40 or more. A fundamental calculation will immediately reveal that the resonator (tank circuit) must store in excess of 4,000 kva. of reactive energy. If, moreover, a power supply of conventional design is employed, a plate voltage of approximately 14 kv. would be used so that the circulating currents in the resonator of a given oscillator design would exceed 410 R.F. amperes. A particularly impressive result is obtained upon evaluation of the series resistance (assuming a perfect impedance match) which the output coupling coil reflects into the tank circuit for 100 kw. useful output power. This effective 100 kw. load resistance as seen in series by the tank circuit assumes the low value of only 0.60 ohms. In order to operate at high efficiency, moreover, the 0.60 ohm equivalent load resistor must be very much larger than the intrinsic series resistance of the unloaded resonator circuit. This requirement, in addition to other problems, has been met by the structure of the present invention so that the many stabilizing benefits of high Q oscillator operation are realized in a practical arrangement.

The present invention is particularly directed toward a novel inductor, capacitor rack, tank circuit, and energy coupling structure which serves to solve the problems, discussed above, in an extremely efficient manner. In particular, the present invention comprises an improved inductor which is tuned to parallel resonance in a configuration that includes a unitary capacitor mounting rack so arranged with respect to coolant tubes, and of such configuration with respect to an associated coupling coil, that a compact resonant tank structure of integrated construction, and having high efficiency of operation, results. These several improvements are achieved by employing an inductor preferably comprising a pair of opposed T-sections taking the form of conductive (e.g. copper) sheets associated respectively with interconnected coolant tubes. The said copper sheets and coolant tubes are in turn associated with an improved mounting rack having one or more capacitors supported thereby, which capacitors are at least partially surrounded by the aforementioned coolant tubes, whereby coolant (e.g. water) circulating through said coolant tubes acts to cool simultaneously both the inductor and its associated capacitor or capacitors. This structure, as will become apparent from the subsequent description, in addition to effectively utilizing a common coolant system for cooling both the inductor and capacitor means of the integrated tank circuit, also provides for a relatively high area of inductor skin in a relatively compact assembly, whereby current density is reduced in all parts of the inductor.

Moreover, the coolant system, in addition to cooling both the inductor or capacitor or capacitors employed, preferably comprises rounded tubing, again of conductive material, whereby said tubing provides a "rounded edge" adjacent all extremities of the inductor, thereby reducing the possibility of corona formation; and, as will become apparent from the subsequent description, the composite inductor-capacitor assembly also eliminates the need of separate bolted friction joints between the capacitor and inductor with the attendant possibility of power loss in such friction joints. In the particular example cited earlier, a friction joint with but 0.010 ohm resistance would be quite objectionable since even such a low value of resistance would generate nearly two kilowatts of power which, of course, manifests itself through concentrated heating effects at the joint and a gradual deterioration of contact surfaces due to oxidation.

The novel inductor of the present invention, by reason of its T-section configuration, as discussed previously, also serves to effect a controlled field spreading adjacent the inductor thereby permitting efficient coupling between said inductor and a fairly large secondary coupling coil mounted adjacent said inductor. The compactness of the overall assembly of the resonator (or tank circuit) in fact so reduces stray series inductance that the output inductive coupling is considerably easier than has been possible heretofore, inasmuch as the magnetic field of the tank inductor is maintained at maximum concentration adjacent the coupling coil.

The foregoing objects, advantages, construction and operation of the present invention will become more readily apparent from the following description and accompanying drawings, in which:

Figure 3 is an illustrative representation of a typical dielectric heating generator output circuit utilizing the improved resonant tank circuit of the present invention; and Figure 4 is an illustrative cross-sectional diagram showing the field spreading effect accomplished by the novel inductor of the present invention.

Figure 1:
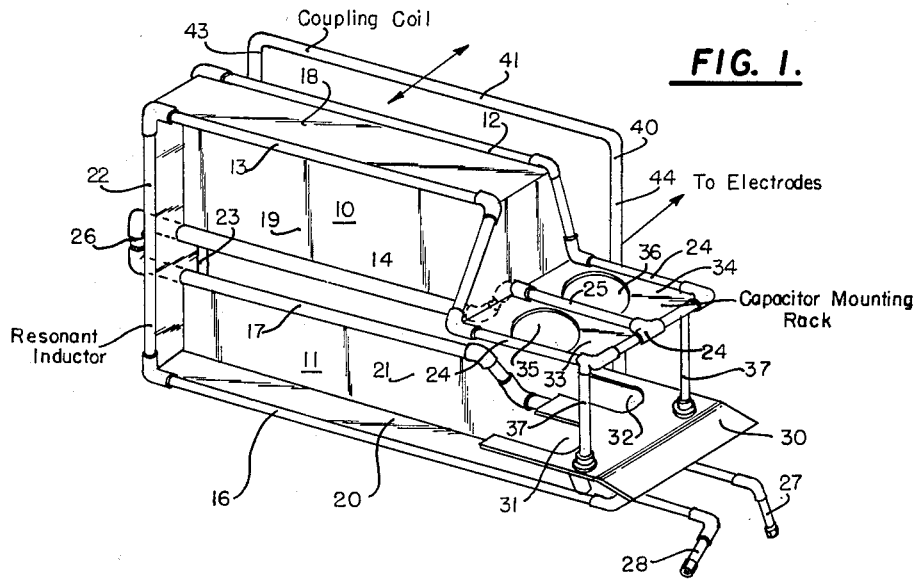
Figure 1 is a perspective view of an improved inductor, capacitor rack, and coupling coil, constructed in accordance with the present invention.

Referring now to the several figures, it will be seen that the novel tank circuit of the present invention comprises an inductor taking the form of two T-sections designated respectively 10 and 11. The said two T-section inductors may best be seen in Figure 4; and the upper section 10 comprises a pair of spaced elongated coolant tubes 12 and 13 and an intermediate larger coolant tube 14; while the lower T-section inductor 11 includes a further pair of spaced elongated coolant tubes 15 and 16 with a further intermediate larger coolant tube 17.

The uppermost coolant tubes 12—13 are interconnected by a copper sheet 18 which is silver-soldered along its opposed elongated ends to the said tubes 12 and 13, and sheet 18 is in turn coupled to central tube 14 by still another, transversely disposed, silver-soldered copper sheet 19. The overall configuration of tubes 12, 13, 14 and sheets 18 and 19 is therefore of T cross-section, as will be most readily appreciated by examination of Figure 4. Similarly, the lowermost tubes 15—16 are interconnected by a further copper sheet 20 which is in turn connected to the central tube 17 by an intermediate, transversely disposed, copper sheet 21. Said sheets 20 and 21 are, as before, connected to one another as well as to their associated coolant tubes 15—16 by silver solder and, as was the case in the upper T-section inductor 10, the lower inductor 11 is also of T-section.

The several coolant tubes 12 through 17 inclusive are disposed in horizontal planes, and are parallel to one another, as may be seen by examination of Figure 3; and these several coolant tubes are in addition interconnected to one another and to a common source of coolant, whereby coolant may be circulated through the said tubes. Thus, referring to Figures 1, 2 and 3, horizontal upper and lower tubes 12 and 15 are interconnected to one another by a vertical coolant tube 23 thereby to effect a U-shaped tubing configuration; horizontal tubes 13 and 16 are interconnected to one another by a vertical coolant tube 22 thereby to effect a further U-shaped tubing configuration; tubes 12 and 13 are interconnected to one another via angularly disposed branch pipes extending to further branch pipes 24—25, and central branch pipe 25 is in turn connected to tube 14; horizontal tubes 14 and 17 are interconnected to one another by a further vertical tube 26 thereby to effect still another U-shaped tubing configuration; tube 17 is coupled to a coolant outlet line 28; and a coolant inlet 27 is coupled to a branch tube 29 which, in turn, interconnects horizontal tubes 15 and 16.

The overall coolant system thus provided surrounds all of the external edges of the two opposed T-section inductors 10 and 11; and water or other coolant supplied at inlet 27 (e.g. by an appropriate pump) will recirculate continuously through the several conductive tubing sections to outlet 28. In particular, the coolant flow (see Figure 3) will be from inlet 27 through branch pipe 29 and thence in parallel through the exterior U-shaped tubing sections via tubes 15—16, 22—23, and 12—13, to branch system 24—25, and thence via central U-shaped tubing 14—26—17 to outlet 28.

Figure 2:
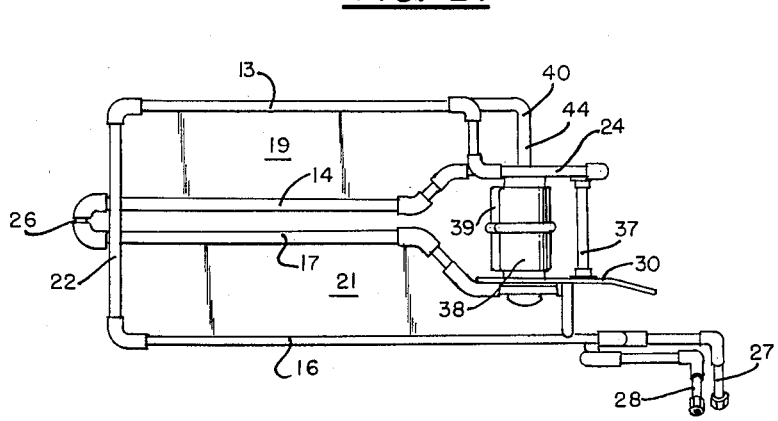
Figure 2 is a side view of the structure shown in Figure 1, with capacitors mounted in the said capacitor mounting rack.

The central tubes 14 and 17 are, as may most clearly be seen in Figures 2 and 4, of larger diameter than the externally disposed more remote tubes, such as tubes 12—13 and 15—16. This larger size is provided in order that the central tubing 14—17 may carry the combined flows from the outer tubes 12—13 and 15—16; and this greater volume of coolant flow through the central part of the inductor is in fact highly desirable inasmuch as it provides for maximum coolant flow adjacent that portion of the inductor having high current density. In this respect, and as will be discussed subsequently in respect to a detailed description of Figure 4, it will be seen that the maximum voltage stress in the opposed T-section inductors 10 and 11 occurs in the region between central conductive coolant tubes 14 and 17; and accordingly, the use of different sized tubing adjacent the upper and central edges of the T-section inductors 10 and 11 automatically effects proportional water cooling of all edges to fit the particular heat dissipating needs of each particular edge of the inductor and, in addition, effects the appropriate grading of voltage stresses of a particular edge, which is also controlled by tubing diameter.

Summarizing the inductor structure thus described, therefore, it will be seen that the inductor is characterized by a configuration comprising two opposed T-sections. These two T-sections have their extremities formed respectively by rounded conductive coolant tubes of a size so proportioned to the actual relative heat dissipation needs of each edge (incurred through $I^2R$ losses), as well as to the voltage insulation requirements of each edge (through control of tubing diameter), that the requirements of each edge are automatically provided by a coolant tube of appropriate diameter adjacent said edge. The several coolant tubes, in addition to providing a desired rounded edge configuration thereby reducing corona, are in turn interconnected to one another by copper sheets disposed in T configuration; and the said sheet copper provides a relatively large conductive skin affording a multiplicity of parallel paths thereby reducing current density in all parts of the inductor. The aforementioned large skin area is in fact provided in a fairly compact assembly due to the opposed or "folded" T-configuration of the inductor sections. This latter consideration increases appreciably the efficiency of the tank circuit and, as will become more readily apparent from the subsequent description, makes inductive coupling to the tank and inductor much easier than has been the case heretofore.

As has been mentioned previously, one of the advantages afforded by the present invention resides in the fact that the inductor provided includes a capacitor mounting rack therein, whereby an extremely compact tank structure may be effected. The rack in fact comprises a first copper sheet 30 supported adjacent the lower coolant tubes 15—16 and defining a pair of elongated slots 31 and 32 therein adapted respectively to receive the lower flanges of substantially conventional vacuum tank capacitors. The rack further includes upper copper sheets 33 and 34, each of which defines a central aperture 35 and 36 respectively; and these latter sheets 33 and 34 are disposed above the aforementioned sheet 30 adjacent branch coolant tubes 24 and 25. A pair of insulators 37 are located (see Figure 1) between lower sheet 30 and upper sheets 33—34; and these insulators, in addition to spacing the said sheets from one another, serve to provide structural rigidity for the forward portion of the overall assembly between the upper tubes 24—25 and the lower spaced tubes 15—16.

This overall assembly, as mentioned previously, comprises a capacitor mounting rack; and in particular, referring to Figure 2, it will be seen that a pair of vacuum capacitors 38 and 39 may be mounted respectively between lower sheet 30 and upper sheets 33—34, with each said capacitor having its extremities passing through one of the lower slots 31—32 and through one of the apertures 35—36. When capacitors 38—39 are so mounted, their flanged edges (which are, as in conventional, connected to internal capacitor electrodes) may be bolted directly to the adjacent copper sheets 30, 33 and 34, thereby eliminating the need of separate conductors interconnecting the capacitors and inductor of the resonant tank circuit; and simultaneously eliminating the high power losses which have characterized such separate conductors and the bolted joints formerly present in such separate conductors. When said capacitors are so bolted in place, the opposed electrodes of capacitors 38 and 39 are electrically connected to the upper and lower (or folded) T-shaped inductor sections 10 and 11 respectively, thereby completing the tank circuit configuration.

Moreover, as will be apparent from examination of the several figures, the two capacitors 38—39, when so mounted, are at least partially surrounded by coolant tubes 15, 16, 17 and 29 adjacent their lower surfaces, and by coolant tubes 24—25 adjacent their upper surfaces; and as a result of this configuration, therefore, the coolant which serves to cool the inductor of the resonant tank circuit also serves to cool the capacitors comprising said tank circuit. The cooled capacitor mount thus maintains appreciably lower temperatures at the glass-to-metal seals of the vacuum tank capacitors 38—39 than has been possible heretofore; and this represents an appreciable advantage over structures suggested in the past, inasmuch as such vacuum tank capacitors, when caused to operate in the aforementioned high-power high-frequency applications, are fairly heavily worked and quite sensitive to abuse.

Summarizing this further aspect of the present invention, therefore, it will be seen that the cooled T-section inductor comprising the improved tank circuit of the present invention also includes a unitary capacitor rack disposed between the folded sections of said inductor, said rack being adapted to support one or more capacitors adjacent the same coolant tubes which serve to cool the inductor. The overall tank structure, therefore, provides a considerably more compact and efficient assembly of inductor and capacitor than has been utilized heretofore.

As has been mentioned previously, one of the significant advantages achieved by the present invention is in the improved coupling which is possible between the resonant tank circuit and an output coil. In the past, the inductor configurations and/or tank circuit configurations have been such that the magnetic field adjacent the tank inductor is fairly confined. This is particularly true in high Q (full load) tank circuits since such operation requires quite low values of inductive reactance in the resonator. This particular feature of known inductor structures has required that output coils coupling energy from the tank circuit to an ultimate utilization circuit be of fairly small size in order to produce efficient coupling; and the small size of output inductor or coupling coil, and high field concentration, has in turn resulted in extremely high current densities with resultant extreme heat dissipation, voltage breakdown, etc.

The T-section inductors 10 and 11, comprising the present invention serve to obviate these known disadvantages of prior inductor structures by effecting a field spreading adjacent the inductor itself whereby a fairly large coil may be employed for coupling energy out of the tank. This particular characteristic of the tank inductor may be most readily appreciated by an examination of Figure 4, and as will be seen from Figure 4, the lines of flux surrounding the inductor are spread by the two folded or opposed T-sections 10—11 so that the resultant field is appreciably wider adjacent the upper conductors 12—13 and lower conductors 15—16 than it is adjacent the central conductors 14 and 17. The maximum voltage stress in the system occurs, as mentioned previously, between central conductive tubes 14 and 17 due to the close proximity of tubes 14—17 to one another, but the problem of this high voltage stress between conductors 14 and 17 has been appropriately solved by proper proportioning of the diameters of the coolant tubes 14—17.

By reason of the field spreading characteristic of the tank, adjacent the upper and lower portions of the tank inductor, energy may be coupled out of the resonant tank circuit utilizing said folded T-section inductor through the agency of a fairly large coupling coil. In particular, referring to Figures 1 through 4, it will be seen that the coupling coil 40 is of a size approximating the size of interconnected U-shaped tubing 12—23—15, by way of example. Figures 1, 2 and 4 have depicted the coupling coil 40 as comprising, essentially, a single turn, while Figure 3 depicts said coil as including two turns. The actual number of turns used in any given application may be selected or varied, as desired, by those skilled in the art. In each case, however, the coupling coil comprises a pair of outer coil sections 41 and 42 disposed substantially coplanar with copper sheets 18 and 20 of the two inductor T-sections 10—11; and substantially parallel, respectively, to outer coolant tubes 12 and 15 of the said inductor portions 10 and 11. Moreover, the coupling coil 40 includes a vertically extending portion 43 which is generally parallel to and coplanar with vertically extending tubing sections 22 and 23 of the inductor; and the said coupling coil contains a further vertical section 44 (see Figures 1 and 2) which extends parallel to capacitors 38 and 39 in the previously described capacitor mounting rack comprising a portion of the novel tank circuit.

The horizontal sections 41 and 42 thus lie in portions of the spread field adjacent horizontal conductors 12 and 15 (see Figure 4). Similarly, the vertically extending portion 43 of the coupling coil 40 lies within a portion of the spread field adjacent the vertically extending portion 23 of the novel inductor; and the vertically extending portion 44 of couping coil 40, by being disposed adjacent the capacitors 38 and 39, effectively utilizes the vertical components of resonator current which pass through the said capaictors 38 and 39. Thus, even though coupling coil 40 is of fairly large size, the several horizontal and vertical portions of the said coupling coil are so located with respect to the inductor and capacitor portions of the tank circuit that maximum coupling is achieved between said tank circuit and coil; and the efficiency of coupling is in fact considerably greater than has been possible heretofore.

The overall tank circuit and coupling coil may, as mentioned previously, be employed in various high-frequency high-power applications. One typical such application comprises a dielectric heater; and a typical arrangement for the improved inductor, capacitor mounting rack, and tank circuit of the present invention, as utilized in such an application, has been illustrated in Figure 3. Thus, referring to Figure 3, it will be seen that the overall system may comprise an oscillator circuit 50, the output of which comprises the resonant tank circuit previously described. For purposes of simplicity, said oscillator circuit has been illustrated as coupled via lines 51 to the network coolant tubes already described, whereby said network is connected across the grids and plates of the oscillator power tubes in oscillator circuit 50; and it will be understood that said network, in association with its interconnecting copper sheets and in further association with capacitors mounted in its unitary capacitor rack, forms a circuit resonant at the frequency of the oscillator. The field produced adjacent the inductor, as well as produced by current flow through the capacitors mounted in the aforementioned capacitor rack, is coupled to the coupling coil 40, as described previously; and the said coupling coil 40 is in turn supported by a plurality of insulators 52 upon a movable carriage 53. The said carriage 53 may be mounted upon appropriate rails or the like, and may be caused to move, e.g. by rotation of a lead screw under control of a motor 54, whereby movement of the carriage 53 toward or away from the resonant tank circuit increases or decreases the coupling between tank circuit and coupling coil 40.

One end of coupling coil 40 is connected via a flexible conductive strap 55, e.g. of sheet copper, to a bus bar 56 which is in turn connected to one plate 57 of a series capacitor 58. The other plate 59 of the said capacitor 58 is supported by an appropriate mounting structure, not shown, whereby it may be moved closer to or away from plate 57, thereby to control the capacity exhibited between plates 57 and 59; and the said movable plate 59 is in turn connected via a further flexible strap 60, e.g. of sheet copper, to ground, as represented by a bus bar 61. The other end of coupling coil 40 is connected via still another conductive strap 62, e.g. of sheet copper, to a transmission line 63 which feeds the electrodes comprising the dielectric heater. As carriage 53 is moved under the control of motor 54 toward or away from the resonant tank output of oscillator circuit 50, the coupling coil 40 is moved closer to or away from the said tank circuit thereby to alter the amount of energy coupled to transmission line 63. The straps 55 and 62 flex during such coupling coil movement in order to permit the electrical connections to be maintained notwithstanding the movement of said coupling coil.

While I have thus described a preferred embodiment of my invention, many variations will be suggested to those skilled in the art. Accordingly, the aforementioned description is meant to be illustrative only and should not be considered limitative of my invention; and all such variations and modifications as are in accord with the present invention are meant to fall within the scope of the appended claims.

Having thus described my invention, I claim:

1. A field spreading inductor comprising first and second conductive members each of which has a substantially T-shaped section, each said T-shaped section having a stem portion an da cross portion, the cross portions of said two members comprising substantially planar conductors the planes of which are disposed in spaced substantially parallel relation to one another, the stem portions of said two members comprising substantially planar conductors the planes of which are disposed substantially coplanar with one another between said spaced cross portions, the free extremities of said two stem portions being disposed closely adjacent to but spaced from one another with said stem portion free extremities being closer to one another than are said cross portions.

2. The combination of claim 1 including tubing interconnected in a continuous flow system, said tubing including portions disposed adjacent the outer free extremities of both the stem and cross portions of both said T-shaped sections, and means for circulating a coolant through said tubing, said last-named means including means for effecting a greater volume of coolant flow through the portions of said tubing disposed adjacent the free extremities of said stem portions than is effected through the portion of said tubing disposed adjacent the free extremities of said cross portions.

3. The combination of claim 1 including conductive tubing disposed adjacent the outer free extremities of both the stem and cross portions of both said T-shaped sections, the diameter of the portions of said tubing adjacent the free extremities of said stem portions being greater than the diameter of the portions of said tubing adjacent the free extremities of said cross portions, and means for effecting a flow of coolant through said conductive tubing.

4. An inductor comprising first and second conductive portions each of which has a T-section, said T-sections being disposed adjacent one another with the stems of said T-sections being substantially colinear and with the free extremities of said stems being closely adjacent to and spaced from one another, each of said conductive portions comprising grounded conductive tubing disposed at the three free extremities of each said T-section, said rounded conductive tubing being interconnected in each conductive portion, in T-configuration, by substantially planar conductive sheets, the diameter of said rounded conductive tubing being greater adjacent the free extremities of said stems than it is adjacent the other two extremities of each said T-section.

5. An inductor comprising a pair of T-shaped conductive sections, each said section comprising first, second and third substantially parallel conductive tubes respectively disposed at the apices of a triangle, and means for reducing leakage inductance and current density in said inductor comprising a first conductive sheet interconnecting said first and second tubes to one another in each said section, a second conductive sheet interconnecting said third tube to said first conductive sheet along a line between said first and second tubes in each said section, the pair of first conductive sheets comprising said pair of conductive sections being disposed substantially parallel to one another, the pair of second conductive sheets comprising said pair of conductive sections being disposed substantially coplanar with one another and extending in said substantially coplanar relation toward one another from said pair of first conductive sheets respectively, means interconnecting the conductive tubes of said pair of sections to one another, and means for circulating coolant through said interconnected conductive tubes.

6. The inductor of claim 5 including capacitor mounting means disposed adjacent the conductive tubes of both said sections, and a further conductive tube section interconnected to the tubes of said pair of sections and at least partially surrounding said capacitor mounting means, whereby coolant circulating through said interconnected tubes simultaneously cools both said inductor and said capacitor mounting means.

7. The structure of claim 5 including a coupling coil adjacent said inductor, said coupling coil including a pair of spaced substantially parallel coil portions disposed in substantially coplanar relation to said pair of first conductive sheets respectively.

8. A resonant tank circuit comprising an inductor and a capacitor, said inductor comprising two electrically interconnected conductive T-sections disposed adjacent one another with the stems of said T-sections being substantially coplanar and with the cross portions of said T-sections being substantially parallel, the free extremities of said stems of said T-sections being disposed closer to one another than are said cross portions, said capacitor being mounted adjacent the free extremities of said T-section stems, said two T-sections being connected to one another by a continuous tubing system extending along portions of each said T-section as well as between said two T-sections, said continuous tubing system including a tubing portion at least partially surrounding said capacitor, and means for circulating coolant through said continuous tubing system.

9. The structure of claim 8 wherein said continuous tubing system comprises rounded conductive tubing, said tubing forming the outermost portion of each free extremity of each said conductive T-section, the tubing in each said conductive section being interconnected in said T-configuration by substantially planar sheets of conductive material adapted to effect reduced leakage inductance and reduced current density in the inductor portion of said tank circuit.

10. The structure of claim 8 including a coupling coil disposed adjacent said inductor in a plane substantially parallel to said coplanar T-section stems, said coupling coil including a first coil portion disposed substantially parallel to the cross portion of one of said T-sections and a second coil portion disposed substantially parallel to the cross portion of the other of said T-sections.

11. The structure of claim 10 wherein said coupling coil includes a third coil portion disposed transverse to said first and second coil portions and located adjacent said capacitor.

12. The structure of claim 8 including a coupling coil disposed in a plane transverse to the planes of said two T-section cross portions, and means for adjusting the position of said coupling coil relative to the plane of said substantially coplanar T-section stem portions.

13. A resonant tank circuit comprising first and second conductive sheets disposed substantially parallel to one another, third and fourth conductive sheets extending in substantially coplanar relation toward one another from said first and second conductive sheets, the adjacent edges of said third and fourth conductive sheets being spaced from one another, and capacitor means supported between the extended planes of said first and second conductive sheets and electrically connected to said first and second conductive sheets.

14. The structure of claim 13 including a fifth conductive sheet disposed substantially parallel to said first and second conductive sheets and located adjacent the said spaced edge of said third conductive sheet, a sixth conductive sheet disposed substantially parallel to said fifth conductive sheet and located adjacent the said spaced edge of said fourth conductive sheet, said capacitor means being supported between said fifth and sixth conductive sheets.

15. The structure of claim 14 wherein said capacitor means comprises a pair of vacuum capacitors spaced from one another between said fifth and sixth sheets.

16. The combination of claim 14 including means for effecting a flow of coolant adjacent portions of each of said first, second, third, fourth, fifth, and sixth conductive sheets.

17. A resonant tank circuit comprising a pair of conductive sheets disposed in spaced substantially parallel relation to one another, capacitor means supported between said sheets with the opposed electrodes of said capacitor means being connected to said pair of sheets respectively, a further pair of conductive sheets respectively attached to said first mentioned pair of sheets, and conductive means electrically interconnecting said further pair of sheets whereby said interconnected further pair of sheets comprises an inductor.

18. An inductor comprising first and second conductive U-shaped tubes, said tubes being disposed in parallel planes respectively with the legs of said U-shaped tubes being substantially parallel to one another, a first conductive sheet interconnecting a first leg of said first U-shaped tube to a first leg of said second U-shaped tube, a second conductive sheet substantially parallel to said first sheet and interconnecting the second leg of said first U-shaped tube to the second leg of said second U-shaped tube, a third conductive U-shaped tube disposed between said first and second sheets at a position between the planes of said first and second U-shaped tubes, and further conductive sheet means interconnecting the legs of said third U-shaped tube to both said first and second conductive sheets.

19. The structure of claim 18 wherein the diameter of the tubing comprising said third U-shaped tube is greater than the diameter of tubing comprising said first and second U-shaped tubes, the distance between the legs of said third U-shaped tube being less than the distance between the legs of both said first U-shaped tube and said second U-shaped tube.

20. A resonant tank circuit comprising an elongated inductor of T-section, said T-section inductor being reversed upon itself whereby two portions of said reversed inductor face one another, the stems of said two facing T-shaped portions being adjacent one another and the cross members of said two facing T-shaped portions being remote from one another, capacitor means mounted between the extended planes of said two remote cross members of said two facing T-shaped portions and means for electrically interconnecting the opposed electrodes of said capacitor means to the facing portions of said T-shaped inductor respectively.

References Cited in the file of this patent

UNITED STATES PATENTS

| | | |
|---|---|---|
| 1,753,408 | Gebhard | Apr. 8, 1930 |
| 2,031,975 | Northrup | Feb. 25, 1936 |
| 2,107,031 | Evans | Feb. 1, 1938 |

UNITED STATES PATENT OFFICE
CERTIFICATE OF CORRECTION

Patent No. 2,921,197 January 12, 1960

Werner Rueggeberg

It is hereby certified that error appears in the printed specification of the above numbered patent requiring correction and that the said Letters Patent should read as corrected below.

Column 5, line 24, for "as in" read -- as is --; column 6, line 65, for "capaictors" read -- capacitors --; column 7, line 10, for "network coolant" read -- network of coolant --; line 64, for "an da" read -- and a --; lines 64 and 65, for "portion s" read -- portions --; column 8, line 27, for "grounded" read -- rounded --.

Signed and sealed this 7th day of June 1960.

(SEAL)
Attest:

KARL H. AXLINE
Attesting Officer

ROBERT C. WATSON
Commissioner of Patents